April 26, 1966 E. O. MORGENSON, JR., ETAL 3,248,523

INFORMATION HANDLING DEVICE

Filed May 2, 1962 2 Sheets-Sheet 1

INVENTOR.
EDGAR O. MORGENSON JR.
WALTER C. FRESCH

BY William R. Nolte

AGENT

INFORMATION HANDLING DEVICE

Filed May 2, 1962 2 Sheets-Sheet 2

3,248,523
INFORMATION HANDLING DEVICE

Edgar O. Morgenson, Jr., Norristown, and Walter C. Fresch, Phoenixville, Pa., assignors to Burroughs Corporation, Detroit, Mich., a corporation of Michigan Filed May 2, 1962, Ser. No. 191,781
9 Claims. (Cl. 235—61.11)

This invention relates to improved switching apparatus and more particularly to such apparatus adapted to be employed in conjunction with a memory unit of a computer system for generating different patterns of output pulses in accordance with perforations sensed in a record medium.

One system of permanent memory storage employed in computer systems in the past has been wired transformer type non-square magnetic cores in which information in the form of programs or constants are stored ineradically for the life of the machine. In such memories the process of reading does not destroy the contents of the memory and no electronic provisions for writing are necessary. For any drive line core-threading pattern the output from a unique word is always the same and can only be changed by mechanically altering this pattern. The bits of the words are initially stored by threading the primary windings only through selected cores. When a given primary winding is energized, only those secondary windings of the cores through which the primary is threaded exhibit an output pulse. Thus the threaded cores produce ONE's and the bypassed cores ZERO's.

Printed circuit plug-in card packaging has been utilized in such permanent storage memories in which each card contains enough core modules for the proper word length and a diode matrix is used for word selection purposes. An example of a complete program memory of the order of one thousand instructions may include twenty of such core cards, in which each card carries seventeen transformer cores. Each magnetic core corresponds to a bit, and a word is seventeen bits in length. In this construction a completely wired printed circuit card contains sixty-four program instructions each seventeen bits long, which means that sixty-four wires could possibly pass through a single core. In this scheme each core stores one bit of a word, and each word is represented by a wire passing through only those cores at bit positions where ONE's are to be stored. In the operation and maintenance of permanent storage memories of this type a need has been demonstrated for a diagnostic program whereby field technicians could insert the diagnostic program and being supplied with a procedure, trouble-shoot the computer. This has been accomplished previously by supplying a plurality of core cards each containing an array of magnetic cores wired with the specific instructions needed to exercise the desired circuitry of the computer. These diagnostic core cards were substituted for specific core cards for reconstituting part of the permanent memory. This approach was found to be disadvantageous and was rejected because it was too cumbersome, in that many different cards were needed. A further disadvantage in the technique was that it did not lend itself to individual problems where specific program steps were wanted, and further it required rewiring of existing memory cards or the wiring of new core cards.

It is an object of this invention, therefore, to provide an improved switching apparatus for diagnostic programming of computer memory units which avoids one or more of the disadvantages of the prior art arrangements and which has an improved ease of operation.

It is a further more specific object of this invntion to provide improved switching apparatus employing a plurality of magnetic cores in conjunction with a punched card and a punched card reader assembly for exercising desired circuitry utilizing outputs from said magnetic cores.

In accordance with the invention, a system is provided for generating different patterns of output pulses to thereby enable instructions to be read into a machine for exercising specific portions of its computer circuitry and comprises a reading assembly for sensing perforations in a record medium, selective switching circuitry associated therewith, and an assembly of magnetic cores each having primary and secondary windings individual to each core. The assembly of cores may be mounted upon conventional plug-in printed card circuitry and, when employed for use, is inserted into a memory device of a computer in substitution for a corresponding printed circuit card having magnetic cores mounted upon it, the latter forming part of the memory. Electric current in the form of pulses available from the selective switching circuitry is routed through reader sensor contacts of the reading assembly which coact with conductive paths of current conducting material secured on a printed circuit member also forming part of the reader assembly. Groups of pin contacts, associated with each bit or magnetic core of the assembly of magnetic cores, are disposed in opposed relationship to said paths of current conducting material so that when a record medium punched with appropriate perforations is inserted in a reader assembly, the contacts make electrical contact with certain current conducting paths on the printed circuit card by passing through the holes of the record medium. The card reader assembly thus acts like a switch in which the punched record medium controls the position of the switch between its two positions. One position of the switch corresponds to a hole and the other a no hole condition and either causes current to pass through a core, or to bypass a core. If current flows through a core, an output voltage is induced in the secondary winding, while if current bypasses the primary winding, no output is produced in the secondary winding, but this current becomes available for application to the next core.

For better understanding of the present invention together with other and further objects therof, reference is had to the following description taken in connection with the accompanying drawings and its scope will be pointed out in the appended claims.

In the drawings, FIG. 1 is an isometric view of the preferred embodiment of apparatus incorporating the present invention;

Figure 1:
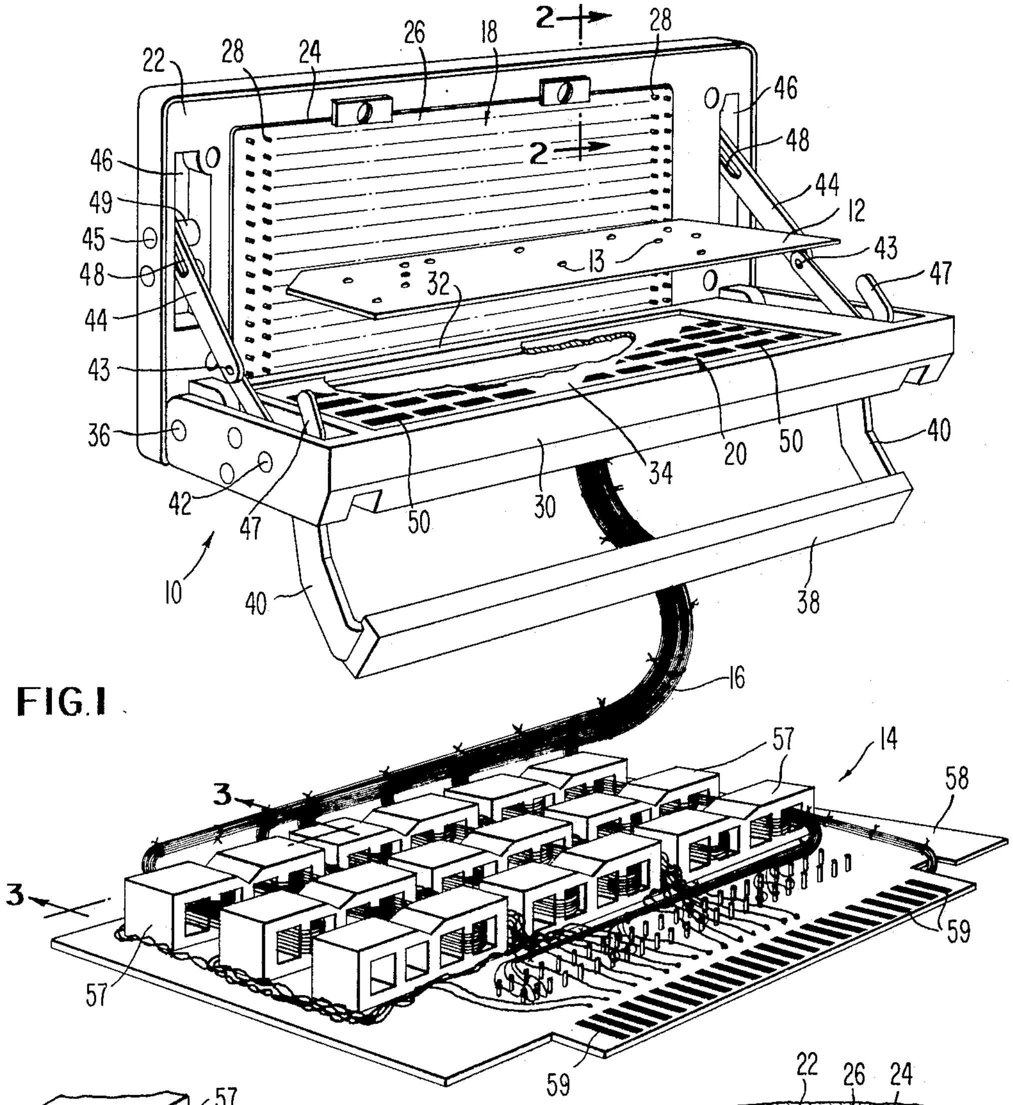
Figure 4:
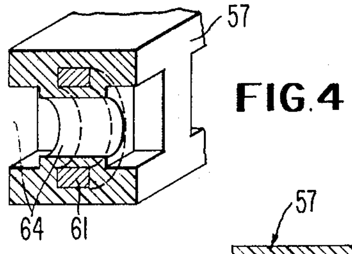
FIG. 4 is a detail pictorial view partially in section through a core assembly illustrating the encapsulation of a magnetic core therein.

Referring to FIG. 1 of the drawings there is shown a complete switching apparatus embodying the invention. This apparatus comprises a reader assembly 10, for sensing a perforated record card 12, which is electrically connected to a magnetic core printed circuit plug-in card assembly 14 as by a cable pack 16. Electrical outputs from the assembly 14 may be changed by varying the information punched into the card 12.

Figure 2:
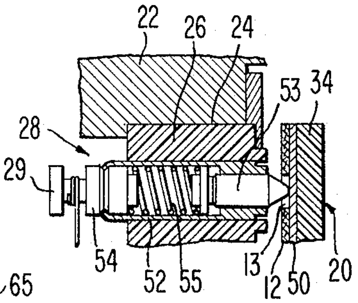
FIG. 2 is a sectional view taken along line 2—2 through a typical sensing pin of the reader assembly illustrating the reading of a perforation in a record medium.

As seen in FIGS. 1 and 2 of the drawings, the card reader assembly 10 includes a vertically disposed sensor contact board assembly 18, and a printed circuit board assembly 20. The sensor contact board assembly includes a frame 22 recessed as at 24 to receive a sensor contact carrying panel 26, the latter being formed of electrically insulative material. A plurality of spring-loaded sensor contact assemblies 28, to be described in greater detail hereinafter, are supported in rows and columns on the sensor contact board. The printed circuit board assembly 20 also includes a frame 30, suitably recessed as at 32 for receiving therein a printed circuit board 34. Frame 22 is pivoted to frame 30 by means of hinge pivots 36. Input and output electrical connections are made through the terminal ends 29 of the spring-loaded contact pin assemblies 28 on reverse side of frame 22 as seen in FIG. 2.

The punched card 12, having perforations 13 also disposed in rows and columns therein, may be read by placing the same in the card reader. Upward movement of handle 38, carries frame 30 upwardly into closed facing relationship with frame 22. Links 40, affixed to opposite ends of handle 38 are each centrally pivoted to frame 30 by a stud 42. Each link 40 is also connected at its inner end by pivot 43 to a second link 44 which in turn is pivotally secured to frame 22 as at 45. The latter frame includes recesses as at 46 to receive a projecting cam-like finger 47 integral with each link 40. Link 44 includes an elongated cut-out portion or slot 48 to permit sliding linear movement of the same relative to the pivot 45. As the frame 30 is rotated about pivot 36, link 44 is advanced into the recess 46, while cam finger 47 on link 40 is cammed into a closed position by riding on camming rod 49 within the recess 46, thus locking the frame 30 into closed face contact with frame 22. With the card reader in its closed position as seen in FIG. 2, selected pin contact assemblies 28 make electrical contact with conductive paths or segments 50 on the printed circuit board 32 by passing through holes 13 in the punched card 12.

Referring still to FIG. 2 it is seen that each sensor contact subassembly 28 includes a barrel housing 52 into which contact pin 53 is mounted at one end for telescopic movement therein. The previously mentioned terminal contact end 29 is suitably secured as by crimping within the opposite end of the barrel. A compression spring 55 extending between the terminal end 29 and the contact pin 53, within the barrel, tends to resist axial movement of the pin in a direction toward its terminal end. The barrel housing 52 may be secured within the contact sensor panel 26 as by press-fitting or in any other suitable manner.

Figure 3:
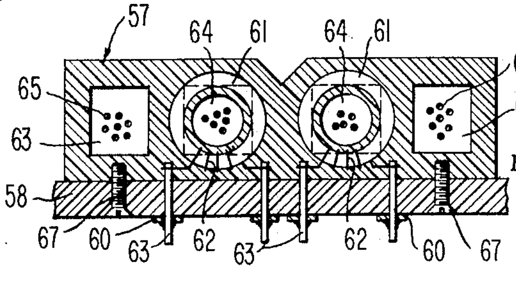
FIG. 3 is a sectional view taken along the line 3—3 of FIG. 1 showing a typical core mounting unit secured to a plug-in type printed circuit board of a memory device.

As seen in FIGS. 1 and 3 the magnetic core printed circuit plug-in unit or assembly 14 includes a plurality of block-like magnetic core units or subassemblies 57 which are mounted on one face of the printed circuit board 58. As beforementioned board 58 is formed of electrically insulative material and includes a plurality of conductive circuit paths 59, 60 disposed on opposed faces thereof which enable the same to be connected with external circuitry such as a memory device in a computer system. For convenience each unit 57 is shown in the preferred and illustrated embodiment as including a pair of transformer type non-square hysteresis loop ferrite cores 61 disposed in upright relationship relative to the bore. Each core moreover includes a secondary winding 62 which is wound around the annulus of the core a predetermined number of times, with the terminal ends of the windings electrically connected at each end thereof to a post 63 which extends through the panel 58. Each block-like core unit 57 utilizes a plastic compound such as a suitable epoxy which when molded maintains the cores and the secondary windings together with the posts 63 in rigid relationship to one another. The molding operation is accomplished in a manner to include an axial opening 64 concentric with the axis of each core 61 to permit the passage of primary windings 65 therethrough. In addition openings 66 are provided adjacent each core to provide return passageways for said primary windings. In the form shown, a primary winding passes through a core only once and is thereafter bent back upon itself and passed through the rectangular access opening 66 and thence into the cable pack 16. Each core assembly 57 may be secured into place upon board 58 by means of a pair of screws 67 passing through the latter bore and into the unit 57 from its lower side. The aforementioned pins 63 may be soldered to the previously mentioned circuit paths 60 so that the output pulses induced in the secondary windings 62 from the cores 59 may be transferred to external utilization circuitry.

Figure 5:
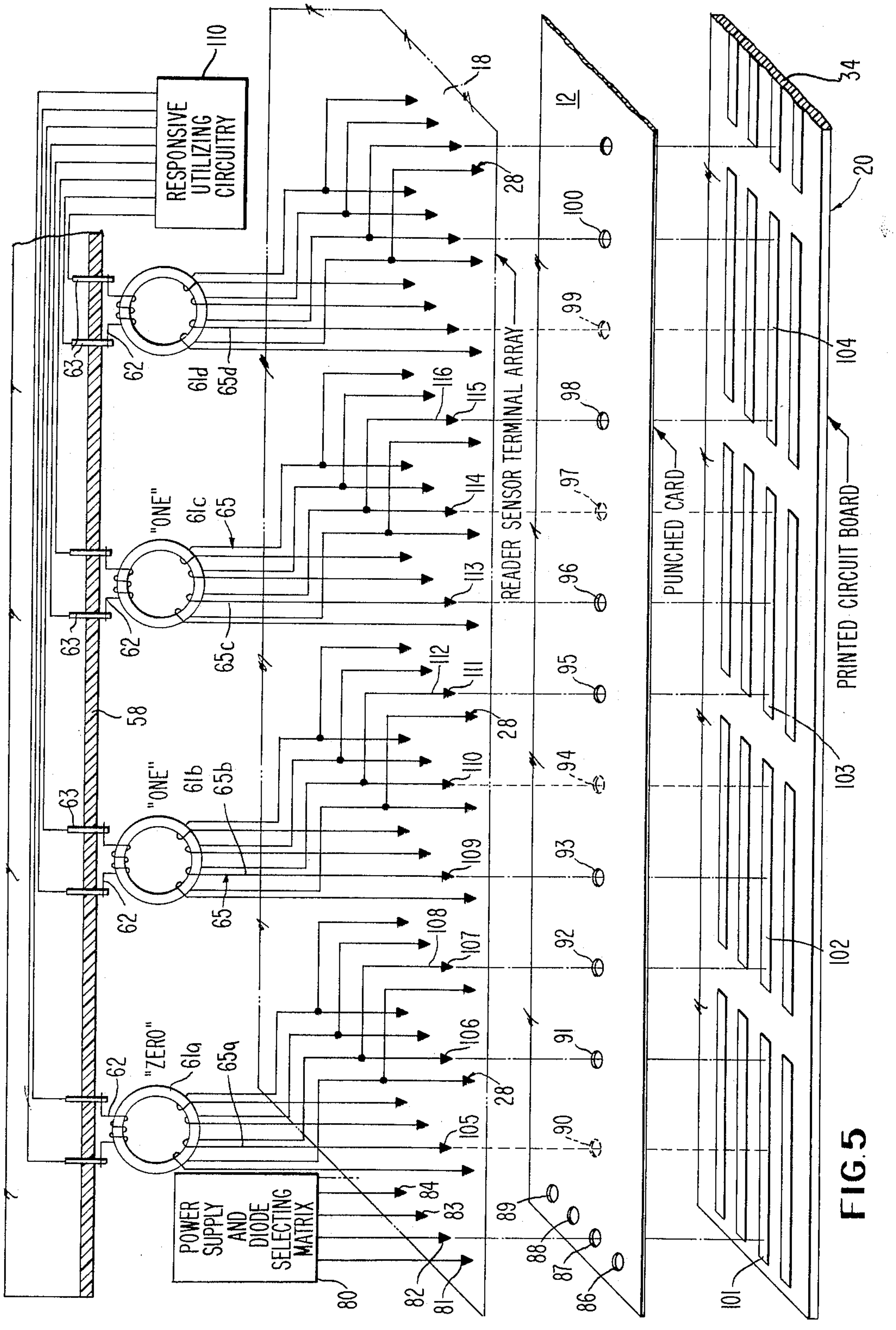
FIG. 5 is a schematic diagram partially in perspective and partially in block diagram form illustrating circuitry embodying the invention.

Referring now to FIGURE 5 there is shown a representation of an assembly within which a punched card 12 is being sensed. The printed circuit board 34 of the card reader is shown as lying beneath the punch card while the reader sensor terminal array 18 is shown as being disposed above the card. Situated above the sensor array 18 is a schematic representation of the printed circuit card 58 shown in cross-section to which is attached, adjacent its lower surface, a plurality of magnetic transformer cores **61*a*, 61*d*. A power supply and selecting matrix 80, which may be a diode selecting matrix, is shown beneath the plug-in printed circuit board 58 with certain leads thereof connected to the left most column of sensor terminal pins 81–84 inclusive. The diode selecting matrix 80 may be of the type described in chapter 2 of the text entitled Digital Computer Components and Circuits by R. K. Richards, published by the Nostrand Company, 1957, and is adapted to provide a selective energizing current pulse on one of the above mentioned sensor contacts 81 to 84 inclusive. The previously mentioned primary windings 65 are likewise shown as encircling cores 61*a*–64*d* inclusive and each of its terminal ends is connected to a sensor connector 28**.

Considering the punched card 12 in greater detail it is seen that a column of perforations 86 to 89 inclusive are disposed in facing aligned relationship opposite the column of sensor pins 81 to 84 associated with the diode matrix 80. The punched card for purposes of illustration is also shown as containing a single row of perforation locations bearing reference characters 90 to 100 inclusive with reference characters 90, 94, 97, 99, shown in dotted lines representing "no-hole" conditions in the card. In line with the single row of perforation locations and disposed thereabove is a row of sensor pins for reception through said perforations to make contact with a row of printed circuit pads 101 to 104 inclusive disposed beneath the perforations. More specifically it is seen that sensor pin 105 is connected to one end of primary winding **65*a* and that sensor pin 106 is secured to the other end of said winding both pins being disposed opposite printed circuit pad 101. Sensor pin 107 connected to primary winding 65*a* by means of lead 108 is disposed opposite conductive surface of pad 102. In a similar manner the next adjacent sensor pins 109, 110 in the row connected to primary winding 65*b* are located opposite pad 102 while the sensor pin 111 connected to the same winding by lead 112 is disposed opposite the next adjacent conductive surface of pad 103. The endmost terminal connector in the row, not shown, may be suitably connected such that a current return path to the diode selecting matrix 80** is provided.

In operation, with the punched card 12 properly positioned and with the reader in its closed position as indicated in FIG. 2, the power supply and diode selecting matrix 80 then makes available signals in the form of current pulses to one of the sensor terminal pins 81 to 84 inclusive, FIG. 5. If for instance pulses are routed to sensor 82 the same will pass through perforation 87 and energize conductive strip 101 in the printed circuit board 34. The "no-hole" condition designated by reference character 90 prevents sensor pin 105 from contacting pad 101. The hole 91 however permits sensor pin 106 to contact this pad thereby enabling current to pass through a portion of primary winding **65*a* but not encircling core 61*a* to its junction with lead 108 and then to pad 102 by means of sensor pin 107. In this situation the transformer core 61*a* produces a "ZERO" output. Sensor pin 109 in contact with pad 102 passes current completely through primary winding 65*b* to lead 112 (with "no-hole" condition at 94) to sensor pin 111 to thus energize winding 65*b* to produce a "ONE" output in core 61*b*. With respect to core 61*c* it is observed that conductive path 103 by means of terminal pins 111, 113 energizes primary winding 65*c* which in turn through core 61*c* is enabled to produce an output in its associated secondary winding 62. Thus cores 61*a*, 61*b*, 61*c* exhibit a "ZERO," "ONE" and a "ONE" respectively upon reading the apertures in the particular row of apertures illustrated in the punched card. It is apparent that successive rows of apertures would be read in a similar manner as the diode matrix successively energized sensor terminal pins 81, 83, 84**, etc.

From the above it is observed that three terminal sensor pins are associated with each bit of each word and are located opposite a printed circuit where a strip of current conducting material may be plated. When a card punched with appropriate holes is placed in the reader, a current path is created always from the first contact for example 82 of the group of three 82, 105, 106, through a punched hole 87 in the card to strip 101 then returning upwardly to terminal 105 or 106, never both, depending upon the path created. The path is thus created for each bit corresponding to primary winding 65 of each word.

It is further seen that the transformer secondary windings are connected to responsive utilizing circuitry 110 for data transferred where the number of transformer cores employed corresponds to the number of bits required. Word capacity is limited by the number of wires which can pass through a core associated therewith. Since each bit requires three terminal pins the limit of the system is imposed only by the number of sensor contacts which may be incorporated into the reader. It is further evident therefore that libraries of punched cards may be prepared for insertion in the reader assembly 10 to thus generate different patterns of output pulses from the transformer core assembly 14 in accordance with the perforations sensed.

While there have been described what are at present considered to be the preferred embodiments of this invention, it will be obvious to those skilled in the art that various changes and modifications may be made therein without departing from the invention, and it is, therefore, intended in the appended claims to cover all such changes and modifications as fall within the spirit and scope of the invention.

What we claim is:

1. A system for generating different patterns of output pulses in accordance with perforations sensed in a record medium, comprising in combination, a plurality of magnetic cores, each core having a number of individual primary windings and a secondary winding associated therewith, a plurality of sensor connectors movable between two positions and secured to the terminal ends of each of said primary windings, current conducting means individual to each core, circuit means for selectively energizing certain ones of said current conducting means, said record medium upon insertion of the same between said sensor connectors and said current conducting means being effective to control the location of each said sensor connector between its two positions, one position corresponding to a perforation in the record medium, and the other position a no perforation condition to thereby cause current to pass through the primary windings of certain cores to produce output voltages in the secondary windings associated therewith, and to bypass the primary windings of other cores without producing an output voltage in the secondary windings associated with the latter other cores.

2. A system for generating different patterns of output pulses in accordance with perforations sensed in a record medium, comprising in combination, a plurality of transformer type magnetic cores, each core having a plurality of individual primary windings and a secondary winding associated therewith, a plurality of sensor connectors movable between two positions and secured to the terminal ends of each of said primary windings, a printed circuit board including current conducting means individual to each primary winding, circuit means for selectively energizing certain ones of said current conducting means, means connected to each primary winding for conveying current from the current conducting means individual to it to the current conducting means individual to a next adjacent winding, said record medium upon insertion of the same between said sensor connectors and said current conducting means being effective to control the location of each said sensor connector between its two positions, one position corresponding to a perforation in the record medium and the other a no perforation condition to thereby enable current to pass through the primary windings of certain cores to produce output voltages in the secondary windings associated therewith and to bypass the primary windings of other of said cores.

3. A system for generating different patterns of output pulses in accordance with perforations sensed in a record medium, comprising in combination, a plurality of transformer cores having substantially linear hysteresis characteristics, each core including at least one primary winding and a secondary winding coupled thereto, a reader assembly having a plurality of sensor connectors, each movable between two positions, and a printed circuit board including a plurality of current conducting paths each individual to one of said cores, each primary winding having three sensor connectors associated therewith, one of the latter secured to one end of said winding and the remaining two being connected to the other end of said winding, said remaining two sensors being disposed in opposed facing relationship to a pair of adjacent current conducting paths on said printed circuit board and adapted to conduct current flow therebetween, circuit means for energizing at least one of said current conducting paths, said record medium upon insertion of the same between said sensor connectors and said current conducting paths being operative to control the location of each said sensor connector between either of said two positions, one position thereof corresponding to a perforation in the record medium to enable current to pass through the primary windings of certain cores to produce output voltages in the secondary windings associated therewith, and to another position to bypass the primary windings of other of said cores.

4. A system for generating different patterns of output pulses in a number of magnetic cores in accordance with perforations sensed in a record medium, comprising in combination, a plurality of magnetic cores having a substantially linear hysteresis characteristic, current conductive input means, means supporting said plurality of cores, each of said cores including a primary winding and a secondary winding individual thereto, a reader assembly having an array of sensor connectors, means for supporting said sensor connectors, certain ones of said sensor connectors being connected to said current conductive input means and other of said connectors being connected to the terminal ends of said primary windings, a printed circuit board including a plurality of current conducting paths one for each core arranged in facing relationship with said sensor connectors, each said sensor connector being movable from one position in electrical engagement with a current conducting path to another position out of engagement with said path, the primary winding associated with each core being connected to three of said senor connectors, with two of the three sensor connectors being disposed opposite one of said conducting paths and the remaining connector being in opposed relationship to a next adjacent conducting path associated with a next adjacent magnetic core, said record medium upon insertion of the same between said array of sensor connectors and the current conducting paths on said printed circuit boards being operative to control the movement of each said sensor connector between either of its positions, one position thereof corresponding to a perforation in the record medium and the other a no perforation condition, to thereby enable current to pass through the primary windings of certain cores to produce output voltages in the secondary windings associated therewith, and to bypass the primary windings of other cores without producing an output voltage in the secondary windings associated with the latter other cores.

5. A system for generating different patterns of output pulses in a number of magnetic cores in accordance with perforations sensed in record media, comprising in combination, a plurality of transformer cores exhibiting a minimum retentivity characteristic, an array of sensor connectors each movable between two positions, a printed circuit board including a plurality of current conducting segments, each said core having a primary winding passed therethrough with sensor connectors affixed to the ends of said windings to selectively engage one of said current conducting segments, a lead for each said core connected at one of its ends to one end of said primary winding and having a sensor connector at its other end, each said lead being arranged to bridge and electrically connect a pair of adjacent current conducting segments on said printed circuit board each said core having a secondary winding, current conductive input means having sensor connectors attached to the terminal ends of the latter for engagement with certain of said current conducting segments, and means supporting said array of connectors and said printed circuit board for movement relative to each other in a manner to permit said connectors to be passed through perforations in said record media inserted therebetween, said record media being effective to control the position of each sensor connector in which the same is either in electrical contact with a current conducting segment or out of contact with the same, thereby enabling current to pass through certain ones of said primary windings to produce output voltages in the secondary windings associated therewith while bypassing other of said cores.

6. A system for generating output pulses in accordance with perforations sensed in a record medium, comprising in combination, a magnetic core, a plurality of primary windings and a secondary winding coupled to said core, means for sensing a perforated record medium including an array of sensor pins and an array of current conducting segments, the former adapted to pass through respective perforations in a record medium to make electrical contact with the latter, the terminal ends of each of said primary windings being connected to ones of said sensor pins, said record medium having perforations arranged to permit either one or the other, never both, of said sensor pins attached to the terminal ends to make electrical contact with said individual conductive segments, means connected to said conductive segments to selectively provide a driving current pulse to one of said segments, whereby upon insertion of a record medium between said array of sensor pins and said conductive segments, ones of said sensor pins pass through said perforations to thereby selectively, either energize or bypass a certain one of said primary windings to produce an output in said secondary when said primary winding is energized.

7. A system for generating output pulses in accordance with perforations sensed in a record medium, comprising in combination, a plurality of magnetic cores, each core including a plurality of primary windings and a secondary winding coupled to the same, means for sensing said perforated record medium including an array of conducting segments and an array of sensor pins, the end of each primary winding having one of said sensor pins attached thereto, the sensor pins associated with each said primary winding being disposed in registration with said conducting segments and adapted to pass through perforations in said record medium to make electrical contact therewith, a branching leads connected at one of its ends to one end of each primary winding and having a sensor pin of said array connected at its other end for electrical connection with an adjacent conducting segment, current conductive input means connected to other of said sensor pins for passing current pulses to certain ones of said current conducting segments, said record medium upon insertion of the same between said array of sensor pins and said array of conducting segments enabling certain of said sensor pins to contact opposed conducting segments to complete a current path through selected ones of said primary windings to produce output voltages in secondary windings associated therewith, while preventing other of said sensor pins for making electrical contact with opposite conducting segments to thereby bypass the primary windings of other of said cores.

8. A pattern generator comprising a plurality of magnetic cores, each having at least one primary winding and a secondary winding coupled thereto, sensor pins connected to the ends of said primary windings and to a branching lead which is in turn connected to one end of each said primary winding, a printed circuit board forming a part of a punched record medium reader having a plurality of conductor segments aligned in an operative relationship with those of said sensor pins which extend through punched code locations of an inserted record medium, current input means for providing current to one of said conductor segments for thereafter either passing through certain of said primary windings or bypassing said winding through said conductor segments and thereafter continuing through said branching leads to the next adjacent of said conductor segments, the path taken by said current being under the control of the punched record medium to provide a pattern of output pulses on the secondary windings of those magnetic cores whose primary windings are not bypassed.

9. A reader assembly comprising, a hinged cover with spring loaded sensor pins spaced for registration with punched code locations of a insertable record medium, a base member having a plurality of conductor segments arranged in an array of rows and columns spaced in an operative relationship with those sensor pins which extend through a punched code location of an inserted record medium, a plurality of magnetic cores having a substantially linear hysteresis characteristic with a plurality of primary windings and a secondary winding coupled to each of said cores, connections from the ends of said primary windings to respective sensor pins with the sensor pins of the several primary windings of each said core being located for registration with the conductor segments of respective columns of said array, input means for applying an energizing current to a single one of said column segments to apply current to the desired one primary winding associated with such segment only if appropriate selected contact is made between its sensor pins and such segment through an inserted record medium, a connection from one end of each primary winding of said cores to a further sensor pin for making a bridging connection to the segments of the next adjacent column of said array associated with the next adjacent magnetic core through such inserted record medium, whereby with appropriate coding of such record medium a continuous current path may be completed through a selected primary winding of certain of said cores while bypassing other of said cores to generate a pattern of output pulses on the secondary windings of those cores through which a current passes by virtue of a desired code of punching of such inserted record medium.

References Cited by the Examiner

UNITED STATES PATENTS 2,864,909 12/1958 Cobb ---------------- 200—46
3,058,097 10/1962 Poland ---------- 235—61.114

FOREIGN PATENTS 874,473 8/1961 Great Britain.

ROBERT C. BAILEY, *Primary Examiner.*

MALCOLM A. MORRISON, *Examiner.*